United States Patent
Gromelski et al.

(10) Patent No.: US 6,377,161 B1
(45) Date of Patent: Apr. 23, 2002

(54) METHOD AND APPARATUS IN A WIRELESS MESSAGING SYSTEM FOR FACILITATING AN EXCHANGE OF ADDRESS INFORMATION

(75) Inventors: Lisa Jane Gromelski, Fort Worth, TX (US); Gregory Lewis Cannon, Boynton Beach, FL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/132,447

(22) Filed: Aug. 11, 1998

(51) Int. Cl.[7] .......................... H04Q 7/00; H04Q 1/30; G08B 5/22
(52) U.S. Cl. .................. 340/7.45; 340/7.2; 340/7.21; 455/458; 455/420; 455/567; 455/412
(58) Field of Search ............... 455/31.3, 31.1, 455/31.2, 32.1, 38.4, 412, 415, 458, 466, 567, 564, 419, 420; 340/825.44, 7.2, 7.21, 7.45; 709/245, 217

(56) References Cited

U.S. PATENT DOCUMENTS

| 5,128,981 | A | * | 7/1992 | Tsukamoto | 379/58 |
|---|---|---|---|---|---|
| 5,276,729 | A | * | 1/1994 | Higuchi et al. | 379/58 |
| 5,559,860 | A | * | 9/1996 | Mizikovsky | 379/58 |
| 5,604,492 | A | | 2/1997 | Abdul-Halim | 340/825.44 |
| 5,697,060 | A | * | 12/1997 | Akahane | 455/38.1 |
| 5,794,144 | A | * | 8/1998 | Comer et al. | 455/426 |
| 5,850,594 | A | * | 12/1998 | Cannon et al. | 455/31.3 |
| 5,864,298 | A | * | 1/1999 | Vogel | 340/825.44 |
| 5,974,300 | A | * | 10/1999 | LaPorta et al. | 455/31.2 |
| 6,011,976 | A | * | 1/2000 | Cannon et al. | 455/31.3 |
| 6,018,657 | A | * | 1/2000 | Kennedy, III et al. | 455/426 |
| 6,023,230 | A | * | 2/2000 | Dorenbosch et al. | 340/825.44 |
| 6,055,229 | A | * | 4/2000 | Dorenbosch et al. | 370/313 |
| 6,069,886 | A | * | 5/2000 | Dorenbosch | 340/825.44 |
| 6,081,202 | A | * | 6/2000 | Dorenbosch | 340/825.44 |
| 6,087,956 | A | * | 7/2000 | Helferich | 340/825.44 |
| 6,118,980 | A | * | 9/2000 | Dorenbosch et al. | 455/31.3 |
| 6,125,262 | A | * | 9/2000 | Hymel | 455/38.3 |
| 6,144,313 | A | * | 11/2000 | Nakato | 340/825.44 |

* cited by examiner

Primary Examiner—William Trost
Assistant Examiner—Marlean Milord
(74) Attorney, Agent, or Firm—R. Louis Breeden; Roland K. Bowler II

(57) ABSTRACT

A first portable messaging unit (PMU) (122) sends (502) address information to a second PMU through a wireless messaging system, and the second PMU receives (504) the address information. In response, the second PMU makes a check (506) of whether information identical to the address information is stored in its address book (230) and then processes (508–516) the address information in a predetermined manner dependent upon the result of the check.

20 Claims, 3 Drawing Sheets

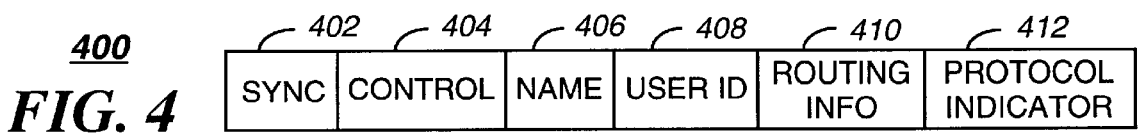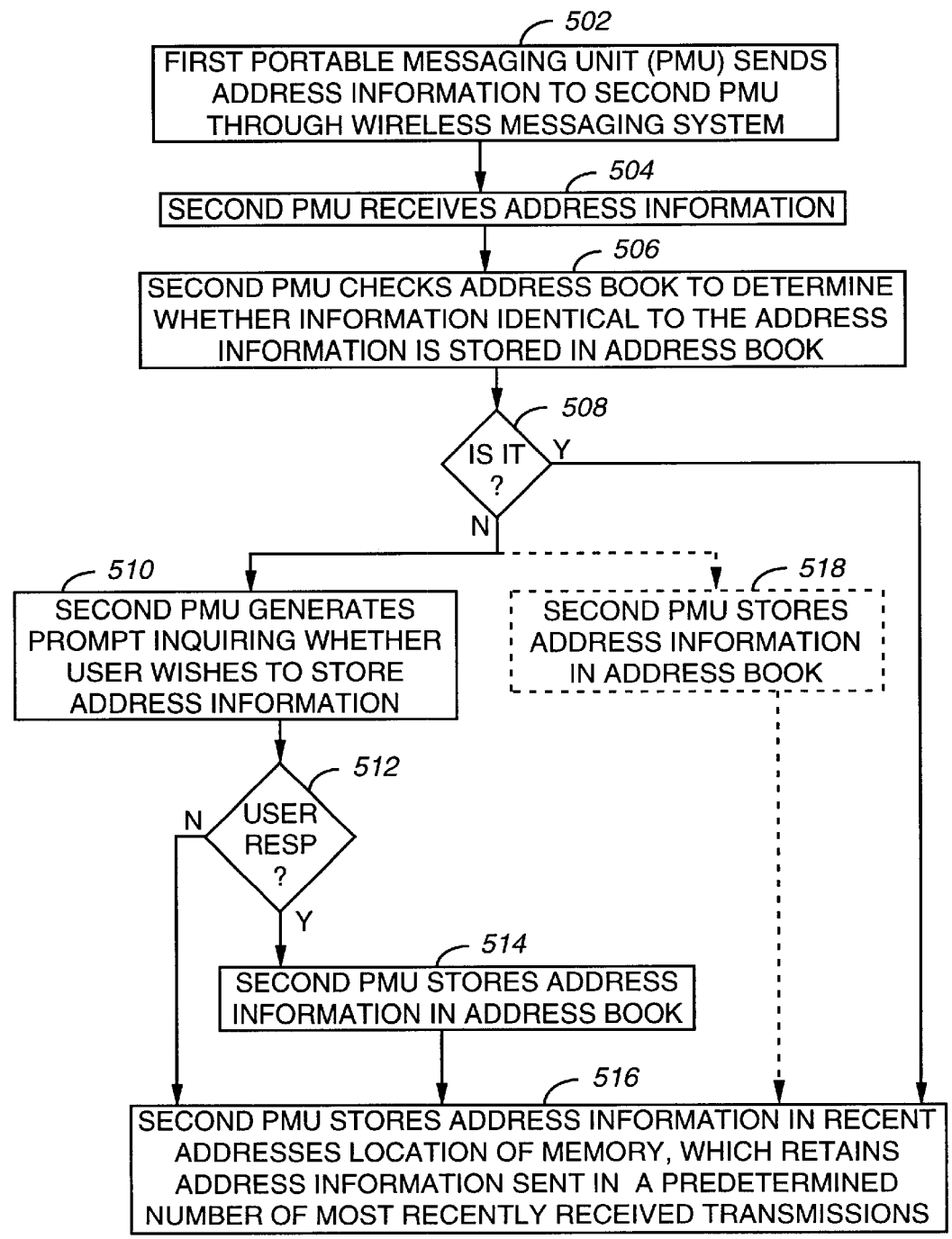

METHOD AND APPARATUS IN A WIRELESS MESSAGING SYSTEM FOR FACILITATING AN EXCHANGE OF ADDRESS INFORMATION

FIELD OF THE INVENTION

This invention relates in general to wireless communication systems, and more specifically to a method and apparatus in a wireless messaging system for facilitating an exchange of address information.

BACKGROUND OF THE INVENTION

Two-way wireless messaging systems are becoming increasingly popular. Such systems allow confirmation of message receipt, as well as two-way text communication, electronic mail access, and even Internet access. A keyboard-equipped portable messaging unit can even send a text message to another portable messaging unit, when the unique address of the receiving unit is known to the user of the sending unit or stored in an address book of the sending unit.

Unfortunately, when the unique address of the receiving unit is not known to the user of the sending unit or stored therein, the process breaks down, and communication cannot be established until the unique address of the receiving unit is established.

Thus, what is needed is a method and apparatus in a wireless messaging system for facilitating an exchange of address information between first and second portable messaging units. The method and apparatus preferably will provide the ability for portable messaging units that have communicated once with one another, to easily re-establish communications with one another at a later time.

SUMMARY OF THE INVENTION

An aspect of the present invention is a method in a wireless messaging system for facilitating an exchange of address information between first and second portable messaging units. The method comprises the steps of sending the address information from the first portable messaging unit to the second portable messaging unit through the wireless messaging system, and receiving the address information by second portable messaging unit. The method further comprises the steps of checking, by the second portable messaging unit in response to the receiving step, whether information identical to the address information is stored in an address book of the second portable messaging unit; and processing the address information, by the second portable messaging unit, in a predetermined manner selected in response to the checking step.

Another aspect of the present invention is a portable messaging unit in a wireless messaging system for facilitating an exchange of address information. The portable messaging unit comprises a transmitter for sending first address information to another portable messaging unit through the wireless messaging system, and a processing system coupled to the transmitter for controlling the portable messaging unit. The portable messaging unit further comprises a receiver coupled to the processing system for receiving second address information from another portable messaging unit. The processing system is programmed to check, in response to receiving the second address information, whether information identical to the second address information is stored in an address book of the portable messaging unit; and to process the second address information in a predetermined manner selected in response to whether information identical to the second address information is stored in the address book.

Another aspect of the present invention is a controller in a wireless messaging system for facilitating an exchange of address information between first and second portable messaging units. The controller comprises a base station interface for receiving the address information from the first portable messaging unit and for sending the address information to the second portable messaging unit, and a processing system coupled to the base station interface for processing the address information. The processing system is programmed to modify the address information before sending the address information to the second portable messaging unit.

BRIEF DESCRIPTION OF THE DRAWINGS

FIG. 4 is a message content diagram in accordance with the present invention.

FIG. 5 is a flow diagram depicting operation of the exemplary wireless messaging system in accordance with the present invention.

DETAILED DESCRIPTION OF THE DRAWINGS

Figure 1:
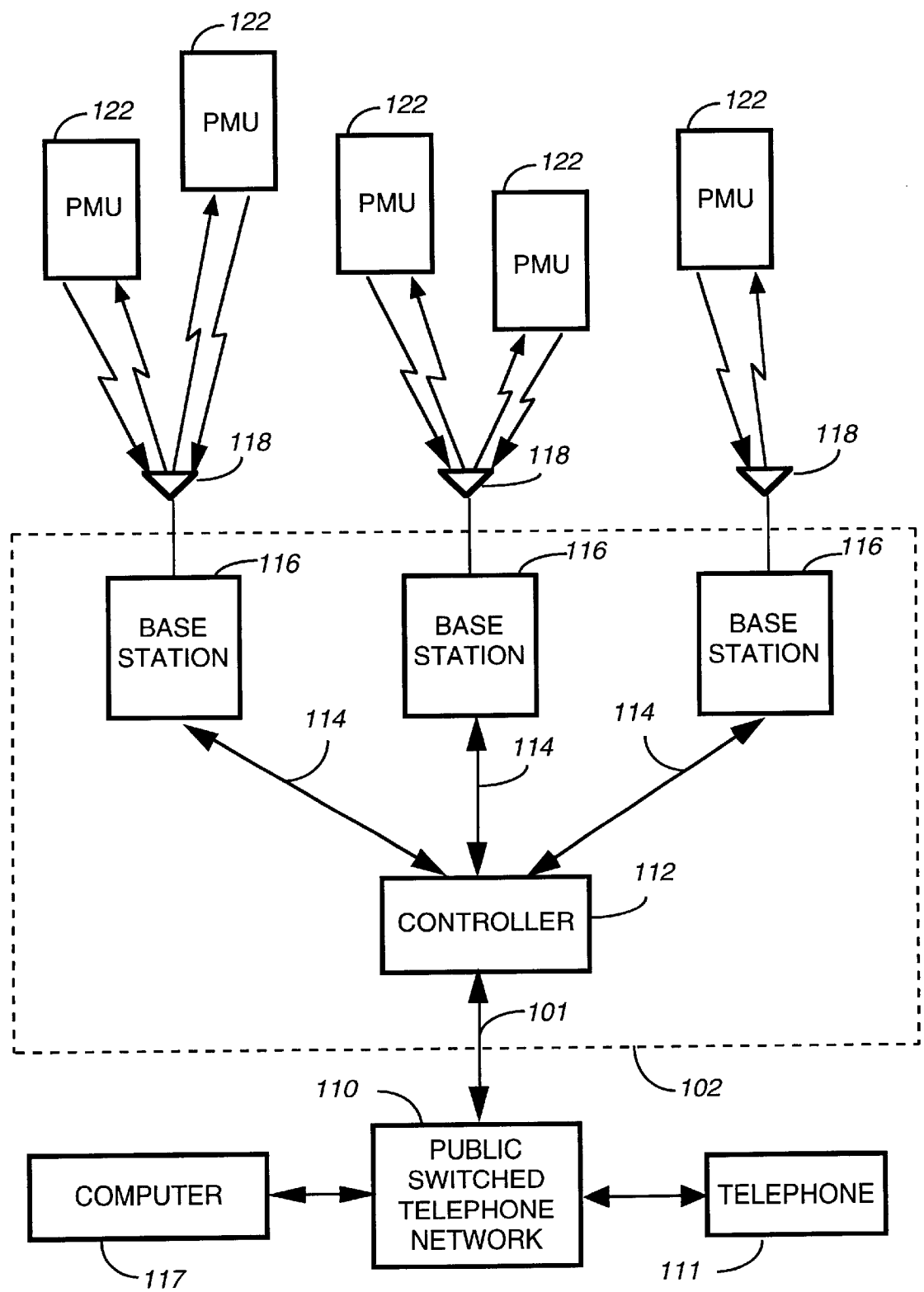
FIG. 1 is an electrical block diagram of an exemplary wireless messaging system in accordance with the present invention.

Referring to FIG. 1, an electrical block diagram depicts an exemplary wireless messaging system in accordance with the present invention comprising an infrastructure portion 102 including a controller 112 and a plurality of conventional base stations 116, the communication system also including a plurality of portable messaging units (PMUs) 122. The base stations 116 preferably communicate with the PMUs 122 utilizing conventional radio frequency (RF) techniques, and are coupled by conventional communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc. The software of the controller 112 is modified in accordance with the present invention, as described further below. The hardware of the base stations 116 is preferably a combination of the RF-Orchestra! transmitter and RF-Audience!™ receivers manufactured by Motorola, Inc. The PMUs 122 are preferably similar to PageWriter™ 2000 data messaging units, also manufactured by Motorola, Inc., and have software modified in accordance with the present invention. It will be appreciated that other similar hardware can be utilized as well for the controller 112, the base stations 116, and the PMUs 122.

Each of the base stations 116 transmits RF signals to the PMUs 122 via an antenna 118. The base stations 116 preferably each receive RF signals from the plurality of PMUs 122 via the antenna 118. The RF signals transmitted by the base stations 116 to the PMUs 122 (outbound messages) comprise selective call addresses identifying the PMUs 122, and data messages originated by a caller, as well as commands originated by the controller 112 for adjusting operating parameters of the radio communication system. The RF signals preferably transmitted by the PMUs 122 to the base stations 116 (inbound messages) comprise responses that include scheduled messages, such as positive acknowledgments (ACKs) and negative acknowledgments (NAKs), and unscheduled messages, such as registration requests.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well.

Figure 2:
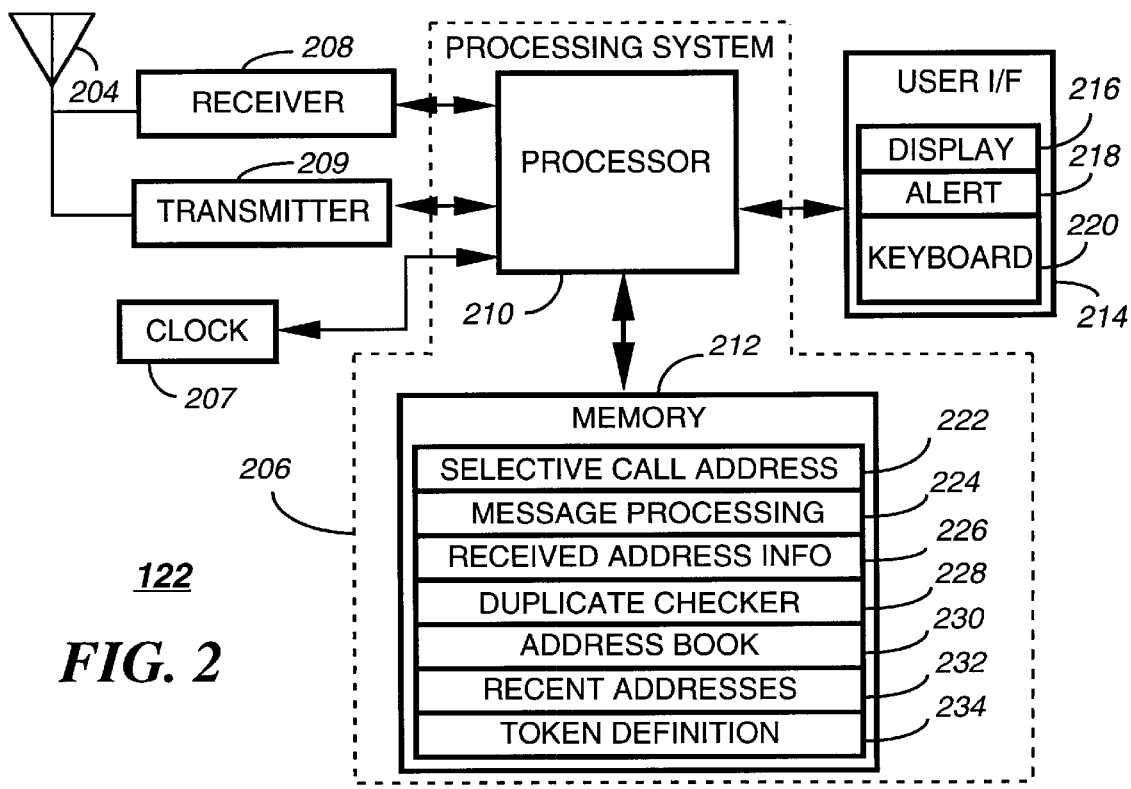
FIG. 2 is an electrical block diagram of an exemplary portable messaging unit in accordance with the present invention.

FIG. 2 is an electrical block diagram of an exemplary PMU 122 in accordance with the present invention. The PMU 122 comprises an antenna 204 for intercepting an outbound message and for transmitting an inbound message. The antenna 204 is coupled to a conventional receiver 208 for receiving the outbound message and coupled to a conventional transmitter 209 for transmitting the inbound message. The receiver 208 and the transmitter 209 are coupled to a processing system 206 for processing the outbound and inbound messages and for controlling the PMU 122 in accordance with the present invention. A user interface 214 preferably is also coupled to the processing system 206 for interfacing with a user. The user interface 214 comprises a conventional display 216 for displaying the inbound and outbound messages, a conventional alert element 218 for alerting the user when the outbound message arrives, and a conventional keyboard 220 for generating the inbound message and for controlling the PMU 122. A conventional clock 207 is also coupled to the processing system 206 for supporting time keeping requirements of the PMU 122.

The processing system 206 comprises a conventional processor 210 and a conventional memory 212. The memory 212 comprises software elements and other variables for programming the processing system 206 in accordance with the present invention. The memory 212 preferably includes a selective call address 222 to which the PMU 122 is responsive. In addition, the memory 212 includes a message processing program 224 for programming the processing system 206 to process messages through well-known techniques. The memory 212 further comprises a location for received address information 226 for enabling the PMU 122 to send a message to another PMU 122 associated with the received address information 226. The memory 212 also includes a duplicate checker program 228 for programming the processing system 206 to check, in response to receiving the address information 226, whether information identical to the address information 226 is stored in an address book 230. The memory 212 further comprises space for recent addresses 232. This memory space retains address information sent in N most recently received transmissions, where N is a predetermined integer, e.g., 20. In addition, the memory 212 includes a token definition program 234 for programming the processing system 206 to cooperate with the controller 112 to define a token that will represent a portion of the address information.

Figure 3:
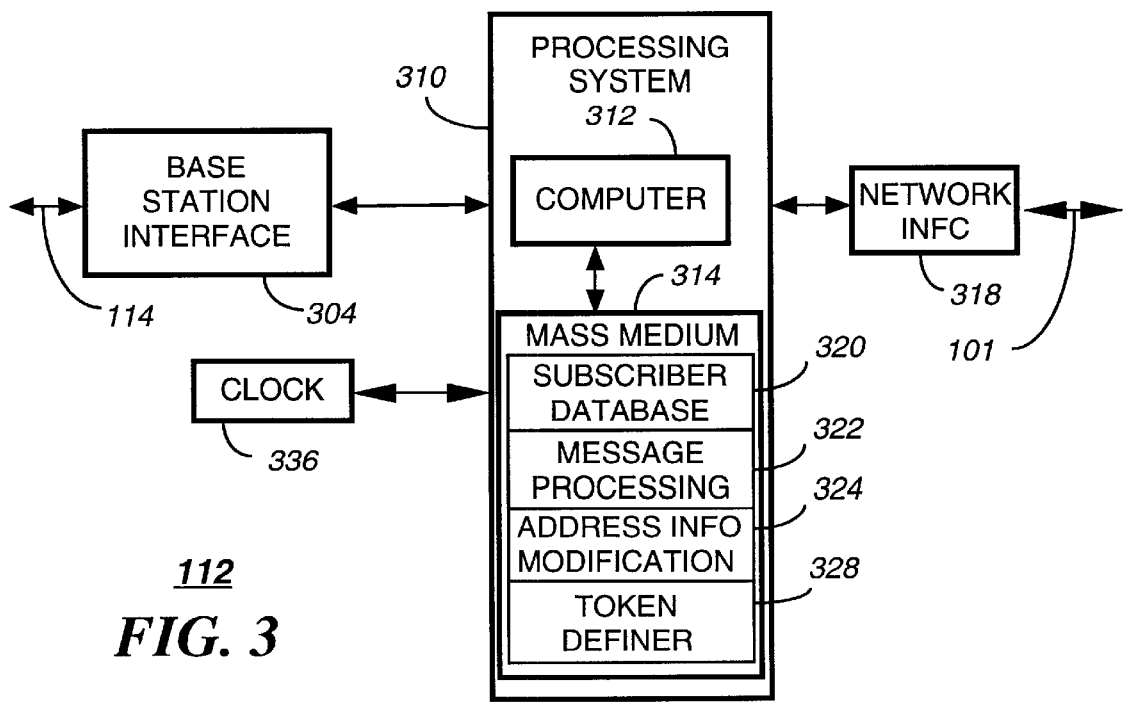
FIG. 3 is an electrical block diagram of an exemplary controller in accordance with the present invention.

FIG. 3 is an electrical block diagram depicting an exemplary controller 112 in accordance with the present invention. The controller 112 comprises a network interface 318 for receiving a message from a message originator via the telephone links 101. The network interface 318 is coupled to a processing system 310 for controlling and communicating with the network interface 318. The processing system is coupled to a base station interface 304 for controlling and communicating with the base stations 116 via the communication links 114. The processing system 310 is also coupled to a conventional clock 336 for providing a timing signal to the processing system 310. The processing system 310 comprises a conventional computer 312 and a conventional mass medium 314, e.g., a magnetic disk drive, programmed with information and operating software in accordance with the present invention. The mass medium 314 comprises a conventional subscriber database 320 for storing profiles defining service for subscribers using the system. The mass medium 314 further comprises a message processing element 322 for processing messages through well-known techniques.

The mass medium 314 also includes an address information modification program 324 for programming the processing system 310 to modify the address information received from a first PMU 122 before sending the address information to a second PMU 122. In addition, the mass medium 314 includes a token definer program 328 for programming the processing system to cooperate with the PMU 122 to define a token that will represent a portion of the address information, and to send the portion of the address information as that token. It will be appreciated that the wireless messaging system can include a plurality of networked controllers 112. In that case, the address information may have to pass from one controller 112 to another through the network interface 318 to reach the second PMU 122, depending upon the location of the second PMU 122 relative to the first PMU 122.

FIG. 4 is a message content diagram 400 in accordance with the present invention. The diagram 400 begins with a synchronization signal 402 for synchronizing a receiver, e.g., the receiver 208, with a transmitter, e.g., a transmitter of the base station 116. The synchronization signal 402 is preferably followed by control information 404 for defining predetermined parameters of the address information message which follows, e.g., message type, recipient's address, and message length. The address information message comprises a user's name 406, e.g., John Smith, a user identification 408 for uniquely identifying the user, e.g., PIN # 1234567, routing information 410 for defining how to route a message to the user, e.g., @skytel.com, and a protocol indicator 412 for defining a protocol to use for sending the message to the user, e.g., email.

FIG. 5 is a flow diagram 500 depicting operation of the exemplary wireless messaging system in accordance with the present invention. The flow begins when the processing system 206 of a first PMU 122 accesses its messaging processing program 224 and sends (502) address information to a second PMU 122 through the wireless messaging system. Preferably, the address information comprises a return address for routing a message to the first PMU 122. Alternatively, the address information can comprise at least one address stored in the address book 230 of the first PMU 122. Preferably, in response to a predetermined user key sequence on the keyboard 220, the address information is sent in a packet similar to that described in the diagram 400, through well-known techniques for addressing and sending inbound and outbound messages. It will be appreciated that the processing system 310 of the controller 112 can access the address information modification program 324 to modify the address information or add new information, e.g., routing information, to the address information.

Alternatively, the controller 112 can access the subscriber database 320 and generate the complete address information packet in response to a command from the PMU 122, along with the normally-supplied address code of the PMU 122. It will be appreciated that, as a further alternative, the address information can be generated automatically by the PMU 122 or by the controller 112 without requiring a user key sequence. In addition, for frequently used address information, a token can replace at least a portion of the address information. The token is preferably defined by the controller 112 in cooperation with the first and second PMUs 122 through accessing the token definer program 328 and the token definition program 234. It will be appreciated that, alternatively, the token can be unknown to the first PMU 122, and the controller 112 can replace, with the token, at least a portion of the address information sent by the first PMU 122 before forwarding the address information to the second PMU 122.

In step 504, the second PMU 122 receives the address information. In response, the second PMU 122 accesses the duplicate checker program 228 and checks 506 its address book 230 to determine whether information identical to the received address information is stored in the address book 230. In checking for identical information, all parts of the address information, e.g., the name, user identifier, routing information, and protocol indicator are checked. If any part of the address information differs from that in the address book 230, the received address information is determined not to be identical. If information identical to the received address information is stored in the address book 230, after step 508, the second PMU 122 does nothing further with the address book 230, and the flow moves to step 516, where the second PMU stores the address information in the space for recent addresses 232, which retains address information sent in a predetermined number of most recently received transmissions.

If, on the other hand at step 508 the address book 230 does not have information identical to the received address information, then the second PMU 122 preferably generates 510 a prompt on the display 216 inquiring whether the user wishes to store the received address information. At step 512, if the user responds affirmatively, the processing system 206 of the second PMU 122 stores, i.e., appends, 514 the received address information in the address book 230 for future use. If, on the other hand, at step 512 the user responds negatively, then the processing system 206 skips step 514. In either case, the flow then moves to step 516, where the second PMU 122 stores the address information in the location for recent addresses 232. It will be appreciated that, alternatively, at steps 510 and 512 the user can be allowed to select among appending the address information to the address book 230, replacing a selected address book entry with the address information, or taking no action.

As an alternative to the prompted store just described, when at step 508 information identical to the received address information is found not to be stored in the address book 230, the second PMU 122 can automatically store 518 the received address information in the address book 230 and then proceed to step 516. This alternative is simple to execute, but is deemed not to be as user-friendly as the preferred operation described in the preceding paragraph.

Thus, it should be clear from the preceding disclosure that the present invention provides a method and apparatus in a wireless messaging system for facilitating an exchange of address information between first and second PMUs. The method and apparatus advantageously provides the ability for PMUs that have communicated once with one another, to easily re-establish communications with one another at a later time. In addition, the present invention advantageously allows address information in the address book of one PMU to be transferred to the address book of another PMU, under user control.

Many modifications and variations of the present invention are possible in light of the above teachings. Thus, it is to be understood that, within the scope of the appended claims, the invention can be practiced other than as specifically described herein above.

What is claimed is:

1. A method in a wireless messaging system for facilitating an exchange of address information between first and second portable messaging units, the method comprising the steps of:

sending the address information from the first portable messaging unit to the second portable messaging unit through the wireless messaging system;

receiving the address information by the second portable messaging unit;

checking, by the second portable messaging unit in response to the receiving step, whether information identical to the address information is stored in an address book of the second portable messaging unit; and processing the address information, by the second portable messaging unit, in a predetermined manner selected in response to the checking step.

2. The method of claim 1, wherein the processing step comprises the step of storing the address information in the address book, when no information identical to the address information is stored in the address book.

3. The method of claim 1, wherein the processing step comprises the steps of:

generating a prompt inquiring whether a user of the second portable messaging unit wishes to store the address information, when no information identical to the address information is stored in the address book; and storing the address information in the address book, in response to an affirmative response to the prompt by the user.

4. The method of claim 1, wherein the address information includes a name identifying a user of the first portable messaging unit, and wherein the checking step comprises the step of checking whether the name is stored in the address book.

5. The method of claim 1, wherein the address information includes a unique user identifier identifying a user of the first portable messaging unit, and wherein the checking step comprises the step of checking whether the unique user identifier is stored in the address book.

6. The method of claim 1, wherein the address information includes routing information for routing a message to the first portable messaging unit, and wherein the checking step comprises the step of checking whether the routing information is stored in the address book.

7. The method of claim 1,
wherein the address information includes a protocol indicator for indicating a protocol that is to be used for routing a message to the first portable messaging unit, and
wherein the checking step comprises the step of checking whether the protocol indicator is stored in the address book.

8. The method of claim 1, wherein the sending step comprises the step of
sending at least a portion of the address information as a token shared between the wireless messaging system and the first and second portable messaging units.

9. The method of claim 1,
wherein the sending step comprises the step of sending to the second portable messaging unit a return address for routing a message to the first portable messaging unit.

10. The method of claim 1,
wherein the sending step comprises the step of sending to the second portable messaging unit at least one address stored in the address book of the first portable messaging unit.

11. The method of claim 1, further comprising in the second portable messaging unit the step of
storing the address information in a memory which retains the address information sent in N most recently received transmissions, N being a predetermined integer.

12. A portable messaging unit in a wireless messaging system for facilitating an exchange of address information, the portable messaging unit comprising:
a transmitter for sending first address information to another portable messaging unit through the wireless messaging system;
a processing system coupled to the transmitter for controlling the portable messaging unit;
a receiver coupled to the processing system for receiving second address information from another portable messaging unit,
wherein the processing system is programmed to:
check, in response to receiving the second address information, whether information identical to the second address information is stored in an address book of the portable messaging unit; and
process the second address information in a predetermined manner selected in response to whether information identical to the second address information is stored in the address book.

13. The portable messaging unit of claim 12, wherein the processing system is further programmed to
store the second address information in the address book, when no information identical to the second address information is stored in the address book.

14. The portable messaging unit of claim 12, wherein the processing system is further programmed to:
generate a prompt inquiring whether a user of the portable messaging unit wishes to store the address information, when no information identical to the second address information is stored in the address book; and
store the second address information in the address book, in response to an affirmative response to the prompt by the user.

15. The portable messaging unit of claim 12, wherein the processing system is further programmed to
store the second address information in a memory which retains address information sent in N most recently received transmissions, N being a predetermined integer.

16. A controller in a wireless messaging system for facilitating an exchange of address information between first and second portable messaging units, the controller comprising:
a base station interface for receiving the address information from the first portable messaging unit and for sending the address information to the second portable messaging unit; and
a processing system coupled to the base station interface for processing the address information, wherein the processing system is programmed to
modify the address information before sending the address information to the second portable messaging unit.

17. The controller of claim 16, wherein the processing system is further programmed to
cooperate with the first and second portable messaging units to define a token that will represent a portion of the address information; and
send the portion of the address information to the second portable messaging unit as the token.

18. A method for exchanging address information between portable messaging units, comprising:
receiving portable messaging unit address information at a portable messaging unit;
determining at the portable messaging unit whether address information identical to the address information received is already stored in an address book of the portable messaging unit; and
storing the address information in the address book if no information identical to the address information is already stored in the address book.

19. The method of claim 18, generating a storage prompt at the portable messaging unit if no information identical to the received address information is already stored in the address book; and storing the received address information in the address book in response to an affirmative input at the storage prompt.

20. The method of claim 18, storing received address information in a memory which retains address information sent in a predetermined integer number of recently received transmissions.

* * * * *